United States Patent [19]
Greulich et al.

[11] Patent Number: 5,346,432
[45] Date of Patent: Sep. 13, 1994

[54] DRIVESHAFT WITH ADDITIONAL MASSES

[76] Inventors: Klaus Greulich, Muhlenstrasse 1, D-5461 Hollig; Peter Amborn, In den Garten 2, D-5206 Neunkirchen, both of Fed. Rep. of Germany

[21] Appl. No.: 751,079

[22] Filed: Aug. 28, 1991

[30] Foreign Application Priority Data

Aug. 29, 1990 [DE] Fed. Rep. of Germany ....... 4027296

[51] Int. Cl.$^5$ .......................... B60K 17/22; F16C 3/02
[52] U.S. Cl. ..................................... 464/180; 464/183
[58] Field of Search .................. 464/180, 181, 183

[56] References Cited

U.S. PATENT DOCUMENTS

| | | | |
|---|---|---|---|
| 875,455 | 12/1907 | Price | 464/183 X |
| 1,645,343 | 10/1927 | Moorhouse | 464/180 X |
| 1,958,982 | 5/1934 | Wintercorn | 464/180 |
| 1,967,487 | 7/1934 | Waisner | 464/180 X |
| 2,001,165 | 5/1935 | Swennes | 464/180 |
| 3,052,107 | 9/1962 | Kempf | 464/180 |
| 3,237,427 | 3/1966 | Scarborough | 464/183 |
| 4,043,147 | 8/1977 | Wiebe | 464/180 |
| 4,392,839 | 7/1983 | Aucktor | 464/183 |
| 4,614,506 | 9/1986 | Sakata | 464/180 X |
| 4,747,799 | 5/1988 | Kato | 464/180 X |
| 4,838,833 | 6/1989 | Coursin | 464/181 |
| 4,895,551 | 1/1990 | Fritz | 464/180 |

FOREIGN PATENT DOCUMENTS

3009277 12/1984 Fed. Rep. of Germany.

*Primary Examiner*—Daniel P. Stodola
*Attorney, Agent, or Firm*—Harness, Dickey & Pierce

[57] ABSTRACT

The invention has a driveshaft (6, 8a, 8b and 10), especially used in the drive line of a motor vehicle (1), with a tubular shaft which has a central tube region ($R_m$) and end pieces (11 and 12) formed on both ends. For optimizing the torsional characteristics of the driveshaft (6, 8a, 8b and 10), it includes at least one mass element (13) which is formed by reducing the inner diameter ($D_i$) and/or increasing the outer diameter ($D_a$) of the shaft wall. These additional mass elements (13) may be arranged symmetrically or asymmetrically in the axial direction of the driveshaft (6, 8a, 8b and 10). If the additional mass elements are arranged asymmetrically, the center of gravity is displaced, thereby optimizing the driveshaft 6, 8a, 8b and 10) of certain vehicle types with respect of its natural frequencies.

6 Claims, 9 Drawing Sheets

DRIVESHAFT WITH ADDITIONAL MASSES

BACKGROUND AND SUMMARY OF THE INVENTION

The invention relates to a one piece driveshaft produced by deformation and used especially in the drive line of a motor vehicle. The driveshaft is in the form of a tubular shaft with a central tube region with end pieces at each end which have toothed receiving regions to connect with torque transmitting elements.

DE-PS 30 09 277 illustrates a driveshaft for use as a side shaft in the drive line of a motor vehicle. The driveshaft substantially includes a tubular shaft comprising two ends with reduced diameters with joint receiving regions. The entire central region of the tubular shaft is cylindrical and is at a maximum outer diameter. In order to achieve a uniform mechanical strength across the entire region of the tubular shaft, the wall thickness is reduced with an increased outer diameter. The disadvantage of this design is that attention centers exclusively on the mechanical strength of the shaft. Only limited attention is paid to adjusting the natural frequency of the shaft to the respective requirements. Generally, the natural frequency is within the range of the excitation frequency of the engine/gearbox system so that avoidance of annoying vibration noise is impossible.

Furthermore, the art shows additional masses, which weigh between 0.5 and 2 kilograms, slid onto the central tube region of the driveshaft. The space for the driveshaft existing in motor vehicles is usually insufficient to optimally position these masses on the driveshaft. Also, the additional weight may have a negative effect on the bending and torsional frequencies as well. Such an increase in unsprung masses also adversely affects the driving behavior of the vehicle.

It is the object of the present invention to provide a driveshaft whose vibration behavior may be improved by using simple design measures to set the natural frequency to values within the frequency range of minimum external excitation, thereby reducing the vibration noise. In accordance with the invention, the objective is achieved by a central tube region having at least one axially limited additional mass element which is provided by a radially thickened shaft wall.

By forming the additional mass in the central tubular region of the driveshaft, it is possible to change the natural torsional frequency without adversely affecting the bending frequency. As a result, an optimized shaft is obtained which greatly improves the weight of the shaft, its load bearing capacity and NVH (noise, vibration, harshness) behavior. Such a driveshaft may be produced from a monoblock hollow shaft or a welded hollow shaft without causing any additional production and assembly costs. Also, the present invention maintains the symmetry of rotation of the driveshaft.

Alternatively, a plurality of additional mass elements may be partially distributed over the outer circumference of the driveshaft. The additional mass is formed by changing the inner and/or outer diameter in the central tube region. This provides an additional mass whose wall thickness may have any dimension relative to the wall thickness of the central region of the tubular shaft. The additional mass of the driveshaft may be arranged symmetrically or asymmetrically in the axial direction, thereby setting the natural frequency to values of minimum external excitation energy.

Experience has shown that by displacing the center of gravity towards one shaft end which, in the subsequent fitting condition in the vehicle, points towards the drive components with the greater mass, considerably reduces vibration noise.

For optimizing the natural torsional frequency, the additional mass, itself, should include a varying wall thickness. At least one additional mass may be arranged symmetrically or asymmetrically in the axial direction of the driveshaft so that, depending on the type of application, the symmetry of the driveshaft is maintained or the above-mentioned advantages are achieved, by giving the driveshaft an asymmetrical design by displacing the center of gravity in the axial direction. In the central tubular region of the driveshaft different masses may be combined for the purpose of optimizing the driveshaft.

From the following detailed description taken in conjunction with the accompanying drawings and subjoined claims, other objects and advantages of the present invention will become apparent to those skilled in the art.

DETAILED DESCRIPTION OF THE DRAWINGS

DETAILED DESCRIPTION OF THE PREFERRED EMBODIMENTS

Figure 1:
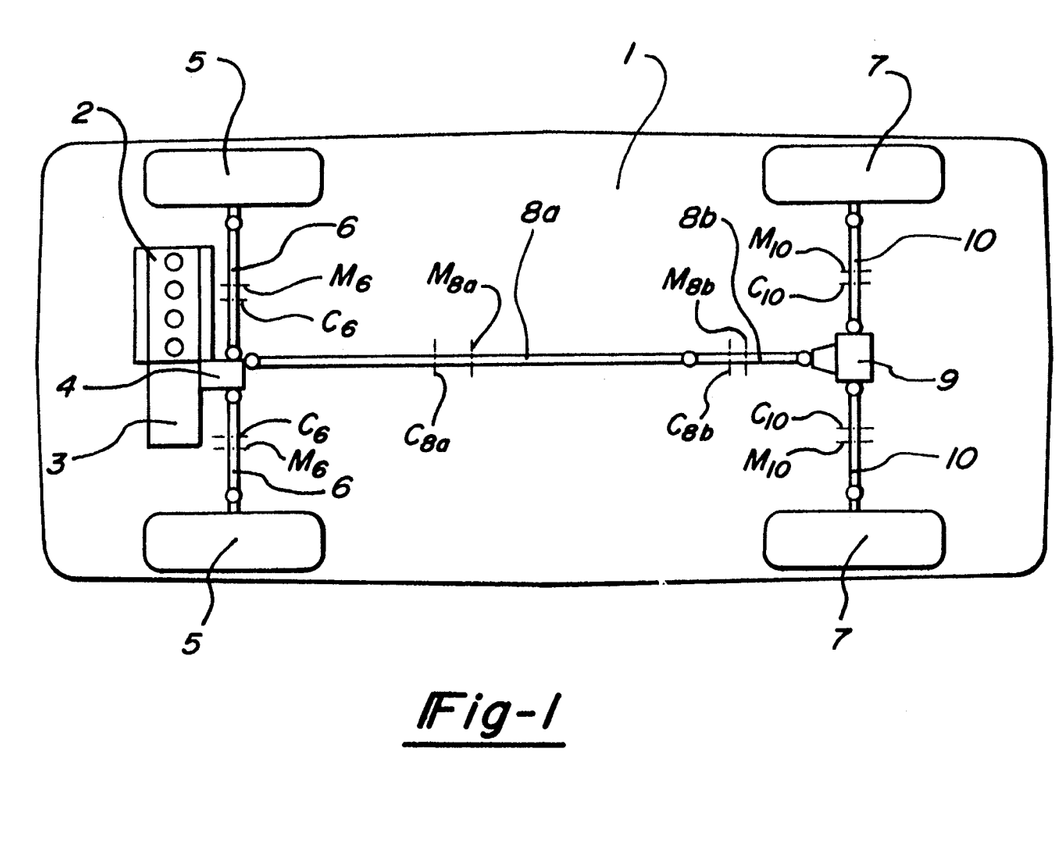
FIG. 1 is a schematic view of a motor vehicle having front and rear driveshafts in accordance with the invention.

FIG. 1 is a diagrammatic illustration of a four wheel drive vehicle 1. The vehicle includes a front engine 2 with a gearbox 3 and a front axle differential 4. The front wheels 5 are driven via front driveshafts 6. The driving torque for the rear wheels is branched off from the front axle differential 4 and transmitted to a rear axle differential 9 via a divided longitudinal driveshaft 8a and 8b. Via rear driveshafts 10, the rear axle differential 9 drives the rear wheels 7. The front and rear driveshafts 6 and 10 as well as the divided longitudinal driveshaft 8a and 8b may be designed in accordance with the invention.

FIGS. 2 to 5 each show a symmetrical driveshaft 6, 8a, 8b, 10. FIGS. 2a to 5a each show an asymmetrical driveshaft in the axial direction which corresponds to FIGS. 2 to 5, respectively. FIGS. 1 through 5A include a line designated with the letter C indicating the center of gravity and a line designated with the letter M indicating the longitudinal center of the shaft. Each driveshaft includes a toothed receiving region at its end pieces 11 and 12. The ends 11 and 12 are received in corresponding recesses of an inner joint member (not illustrated). In the case of the embodiments shown, with the exception of the regions comprising an additional mass element 13, the wall thickness $D_1$ is uniform throughout the central tubular shaft regions. However, it is also conceivable for the wall thickness $D_1$, in the central tubular region $R_m$ of the tubular shaft, to change continuously and to be designed asymmetrically towards the center of the tubular shaft, or for the cross section of the tubular shaft to be stepped. The transition is conical in each case between the central tubular shaft region $R_m$ and the ends 11 and 12.

Figure 2:
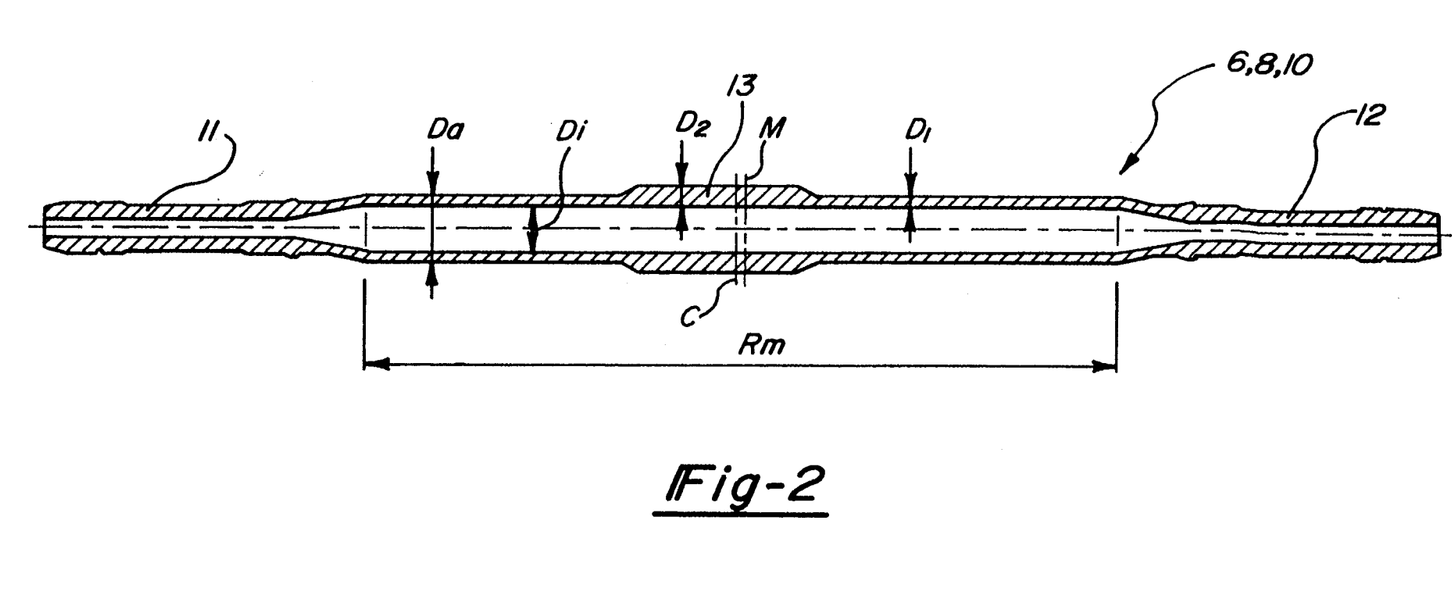
FIG. 2 is a longitudinal section view of a first embodiment of the present invention.
Figure 2A:
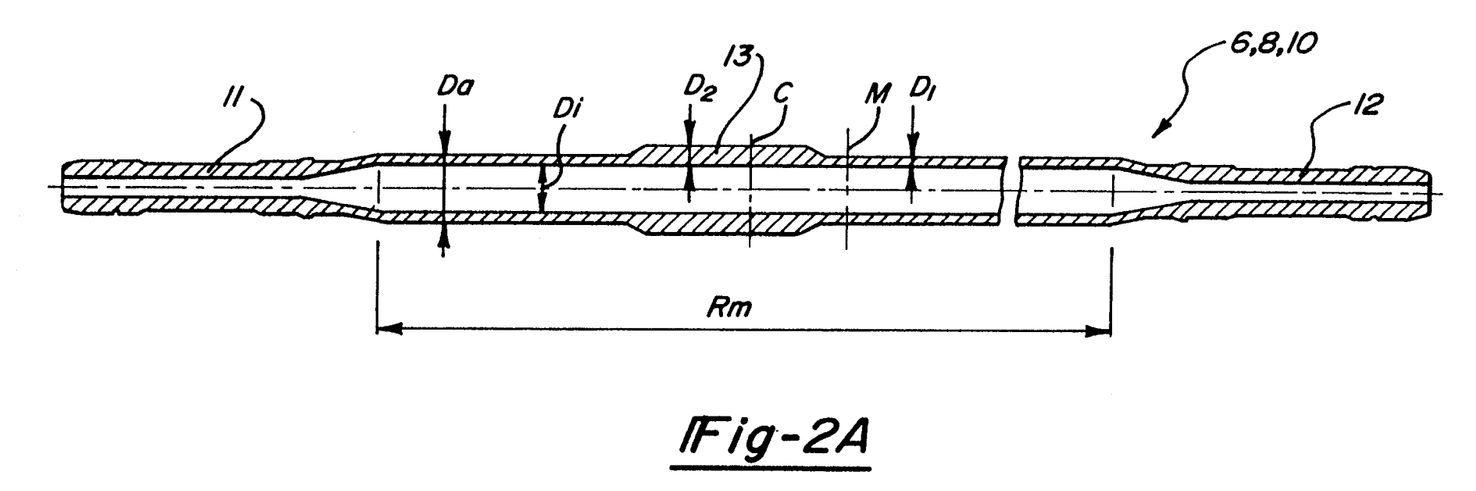
FIG. 2a is a longitudinal section view of another embodiment of the present invention.

FIG. 2 shows a driveshaft 6, 8a, 8b and 10 having a single additional mass element 13 moved towards the left from the center of symmetry M of the driveshaft 6, 8a, 8b and 10. The additional mass element 13 is formed with a wall thickness $D_2$ having an increased outer diameter larger than $D_a$ while having the same inner diameter $D_i$ of the driveshaft 6, 8a, 8b and 10.

Figure 3:
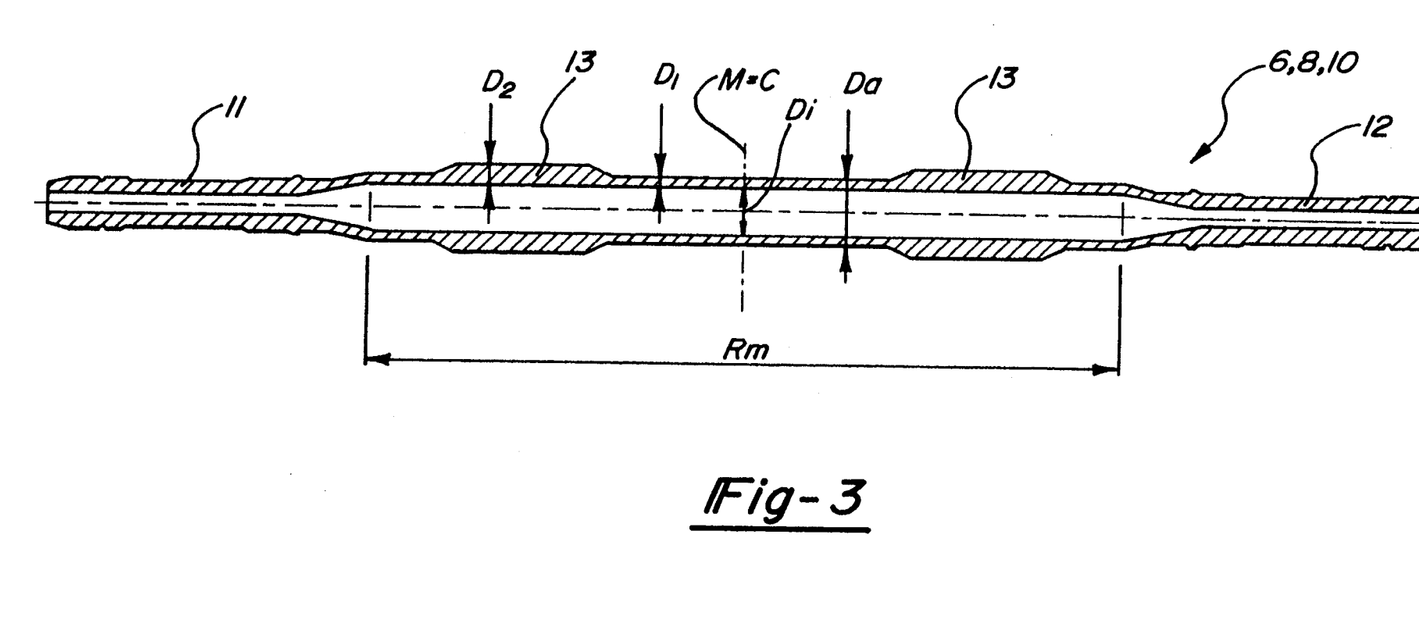
FIG. 3 is a longitudinal section view of another embodiment of the present invention.
Figure 3A:
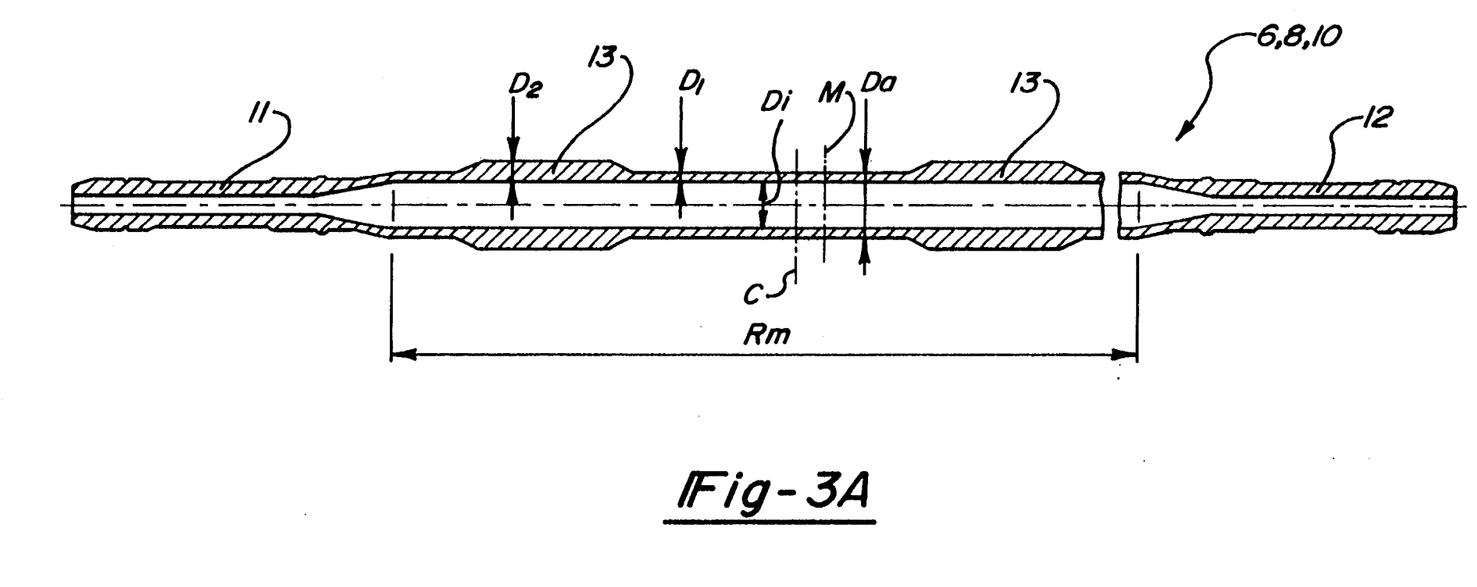
FIG. 3a is a longitudinal section view of another embodiment of the present invention.

FIG. 3 illustrates a driveshaft 6, 8a, 8b and 10 with two additional mass elements 13a arranged axially symmetrical with respect to the central tubular shaft region $R_m$ of the driveshaft 6, 8a, 8b and 10. As in the previous embodiment according to FIG. 2, the two additional mass elements 13a have an increased outer diameter larger than $D_a$. It is also conceivable to provide the two additional mass elements 13a asymmetrically in the driveshaft axial direction as seen in FIG. 3a.

Figure 4:
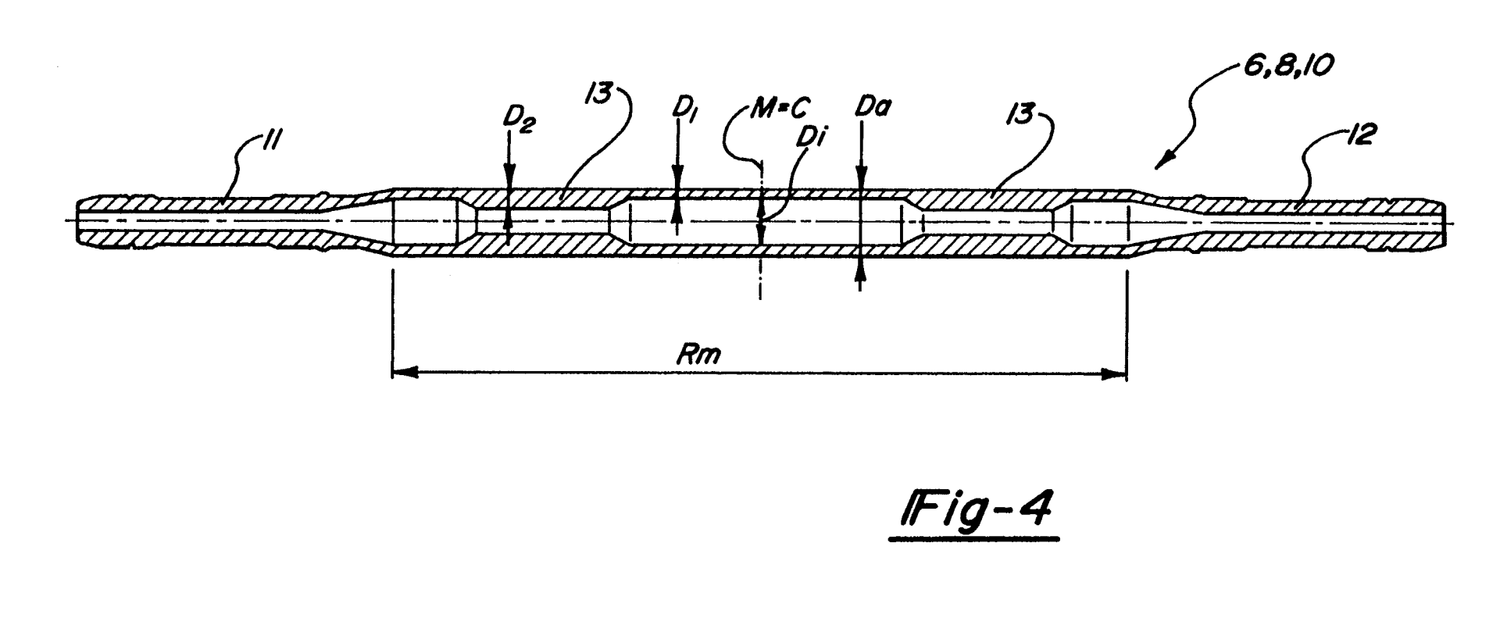
FIG. 4 is a longitudinal section view of another embodiment of the present invention.
Figure 4A:
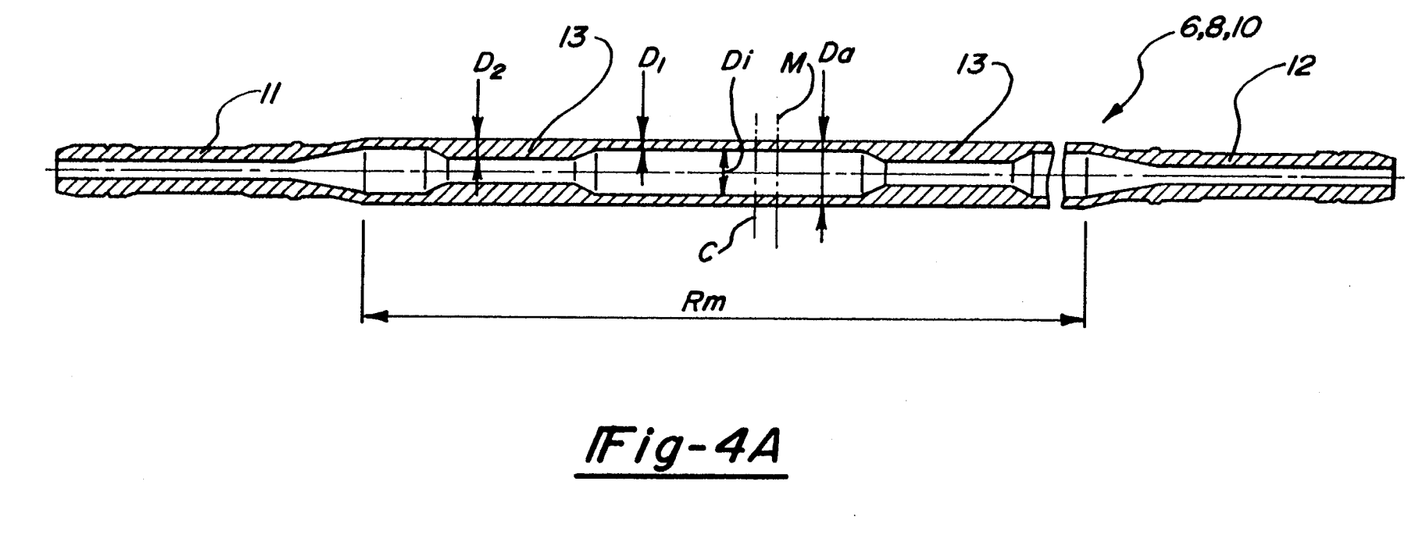
FIG. 4a is a longitudinal section view of another embodiment of the present invention.

FIG. 4 shows a further embodiment of the driveshaft 6, 8a, 8b and 10 which includes two additional mass elements 13b. The mass elements 13 have a reduced inner diameter less than $D_i$, while having the same outer diameter $D_a$ as the driveshaft.

Figure 5:
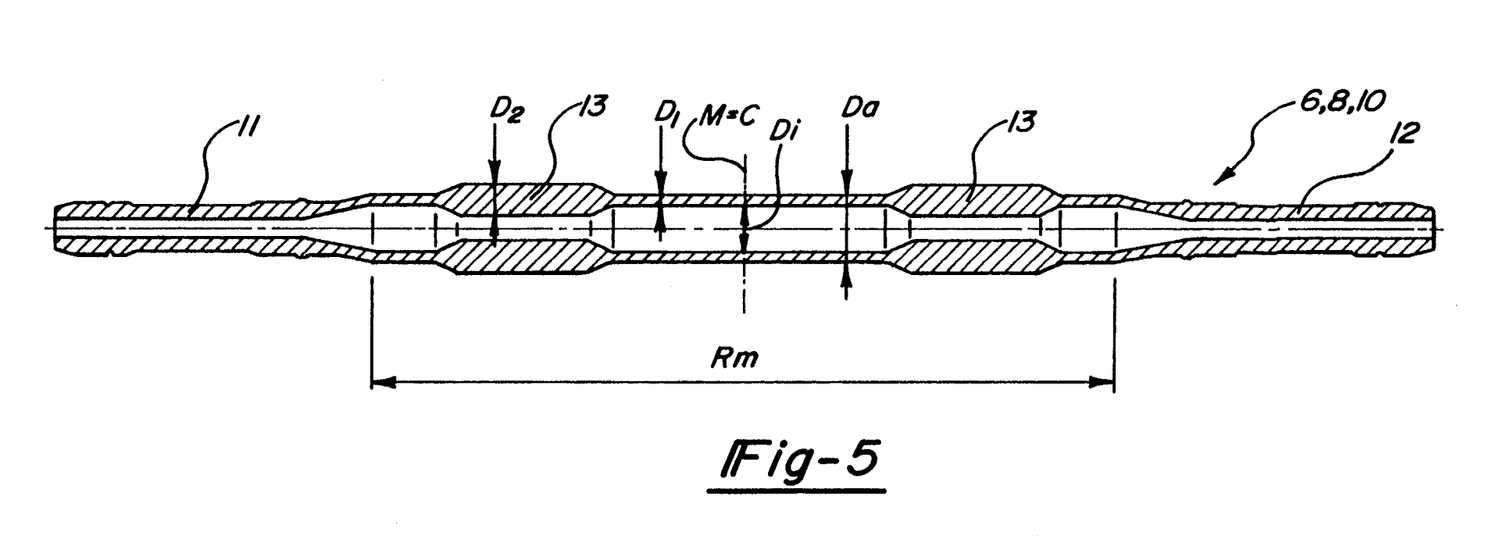
FIG. 5 is a longitudinal section view of another embodiment of the present invention.
Figure 5A:
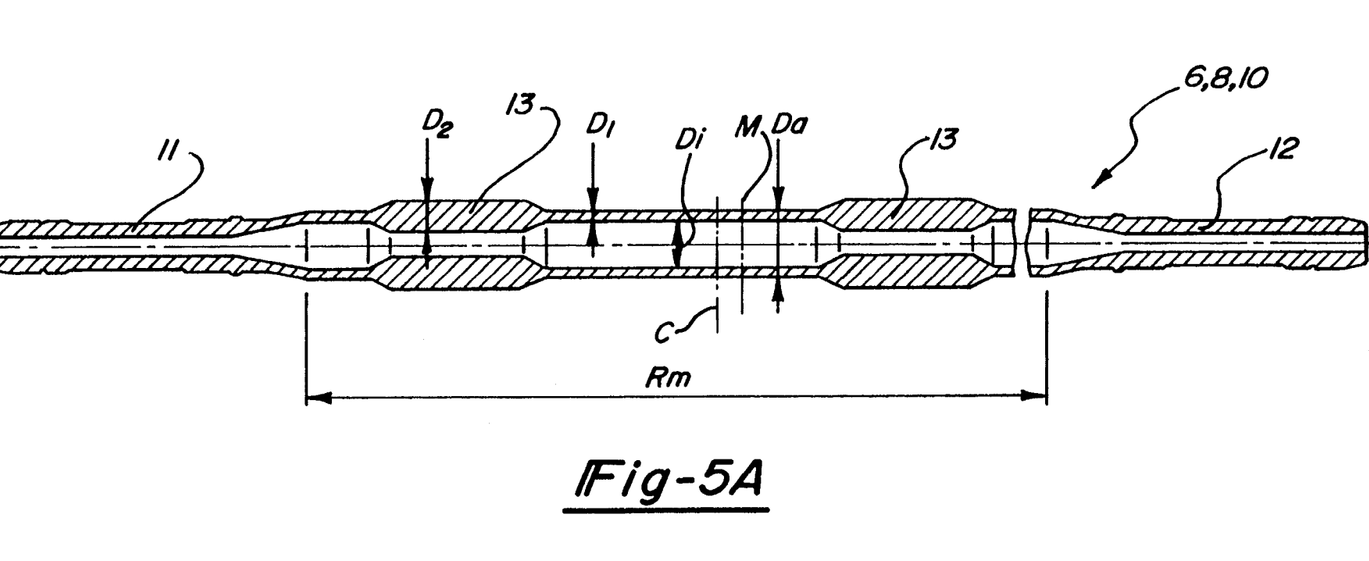
FIG. 5a is a longitudinal section view of another embodiment of the present invention.

FIG. 5 finally shows an embodiment of the driveshaft 6, 8a, 8b and 10 having two additional mass elements 13c arranged symmetrically in the axial direction. The mass elements 13c have reduced inner diameter less than $D_i$ and an increased outer diameter larger than $D_a$. It is also conceivable to provide the two additional mass elements 13c asymmetrically in the driveshaft axial direction, as illustrated in FIG. 5a.

While the above detailed description describes the preferred embodiment of the present invention, the invention is susceptible to modification, variation, and alteration without deviating from the scope and fair meaning of the subjoined claims.

We claim:

1. A one piece driveshaft formed by deformation comprising:

a tubular shaft comprising a central portion, a pair of transition portions adjacent said central portion, and a pair of end portions, each end portion including a toothed receiving portion for connection with torque transmitting means, said tubular shaft showing symmetry of rotation and having a circumferential wall defining an internal central bore passing through said shaft; and at least one mass element integrally connected to and axially positioned along said central tube portion, said mass element unitarily formed with said shaft as a radially thickened wall portion, said wall of said shaft in said transition portions being conical between said central portion and said end portions internally and externally and said wall of said shaft in said central portion being of uniform circumferential thickness with the exception of the area of said at least one mass element and said wall in said central portion having a uniform circumferential thickness and an increased outer diameter or a decreased diametrical central bore in the area of said at least one mass element and said end portion central bore having a constant diameter which is smaller than the diameter of the central portion central bore and said at least one mass element maintains the symmetry of rotation of the driveshaft.

2. A driveshaft according to claim 1, wherein said at least one mass element is symmetrical to maintain axial symmetry of masses of the driveshaft.

3. A driveshaft according to claim 1, wherein the center of gravity of the driveshaft in a vehicle including drive components, points to drive components with greater mass.

4. A driveshaft according to claim 1, wherein said at least one mass element is arranged asymmetrically in the axial direction.

5. A one piece driveshaft formed by deformation comprising:

a tubular shaft comprising a central portion, a pair of transition portions adjacent said central portion, and a pair of end portions, each end portion including a toothed receiving portion for connection with torque transmitting means, said tubular shaft showing symmetry of rotation and having a circumferential wall defining an internal central bore passing through said shaft; and at least one mass element integrally connected to and axially positioned along said central tube portion, said mass element unitarily formed with said shaft as a radially thickened wall portion, said wall of said shaft in said transition portions being conical between said central portion and said end portions internally and externally and said wall of said shaft in said central portion being of uniform circumferential thickness with the exception of the area of said at least one mass element and said wall in said central portion having a uniform circumferential thickness and an increased outer diameter or a decreased diametrical central bore in the area of said at least one mass element and said end portion central bore having a constant diameter which is smaller than the diameter of the central portion central bore, wherein said at least one mass element has a variable wall thickness.

6. A one piece driveshaft formed by deformation comprising:

a tubular shaft comprising a central portion, a pair of transition portions adjacent said central portion, and a pair of end portions, each end portion including a toothed receiving portion for connection with torque transmitting means, said tubular shaft showing symmetry of rotation and having a circumferential wall defining an internal central bore passing through said shaft; and at least one mass element integrally connected to and axially positioned along said central tube portion, said mass element unitarily formed with said shaft as a radially thickened wall portion, said wall of said shaft in said transition portions being conical between said central portion and said end portions internally and externally and said wall of said shaft in said central portion being of uniform circumferential thickness with the exception of the area of said at least one mass element and said wall in said central portion having a uniform circumferential thickness and an increased outer diameter or a decreased diametrical central bore in the area of said at least one mass element and said end portion central bore having a constant diameter which is smaller than the diameter of central portion central bore, wherein a plurality of additional mass elements are positioned on said shaft.

* * * * *

UNITED STATES PATENT AND TRADEMARK OFFICE
CERTIFICATE OF CORRECTION

PATENT NO. : 5,346,432
DATED : September 13, 1994
INVENTOR(S) : Klaus Greulich et al It is certified that error appears in the above-identified patent and that said Letters Patent is hereby corrected as shown below:

In the Abstract, line 14, before "6", insert --(--;

Column 3, line 6, "regions" should be --region $R_m$--;

Column 3, line 32, "13" should be --13b--;

Column 6, line 1, claim 6, after "of", insert --the--.

Signed and Sealed this

Sixth Day of December, 1994

Attest:

BRUCE LEHMAN

*Attesting Officer*  *Commissioner of Patents and Trademarks*